(12) United States Patent
Rolet et al.

(10) Patent No.: US 7,684,282 B2
(45) Date of Patent: Mar. 23, 2010

(54) LOCALIZATION OF A NON-DESTRUCTIVE TESTING PROBE

(75) Inventors: Sebastien Rolet, Plaisance du Touch (FR); Capucine Carpentier, Toulouse (FR)

(73) Assignee: European Aeronautic Defence and Space Company, Eads (FR)

( * ) Notice: Subject to any disclaimer, the term of this patent is extended or adjusted under 35 U.S.C. 154(b) by 0 days.

(21) Appl. No.: 11/885,021

(22) PCT Filed: Feb. 22, 2006

(86) PCT No.: PCT/EP2006/060173

§ 371 (c)(1),
(2), (4) Date: Aug. 24, 2007

(87) PCT Pub. No.: WO2006/089905

PCT Pub. Date: Aug. 31, 2006

(65) Prior Publication Data

US 2008/0170471 A1 Jul. 17, 2008

(30) Foreign Application Priority Data

Feb. 25, 2005 (FR) .................................. 05 50519

(51) Int. Cl.
*G01S 3/80* (2006.01)
(52) U.S. Cl. ..................................................... 367/124
(58) Field of Classification Search ................ 367/13, 367/117, 118, 120, 907, 124; 600/424; 342/126
See application file for complete search history.

(56) References Cited

U.S. PATENT DOCUMENTS

| 4,991,148 | A | | 2/1991 | Gilchrist | 367/124 |
| 5,473,953 | A | * | 12/1995 | Appel | 73/866.5 |
| 5,851,183 | A | * | 12/1998 | Bucholz | 600/425 |
| 6,141,293 | A | | 10/2000 | Amorai-Moriya et al. | 367/127 |
| 2008/0170471 | A1 | * | 7/2008 | Rolet et al. | 367/127 |

FOREIGN PATENT DOCUMENTS

| FR | 2882596 A1 * | 9/2006 |
| WO | WO99/04279 * | 1/1999 |
| WO | WO 2006089905 A1 * | 8/2006 |

OTHER PUBLICATIONS

MSI, "Measurement Specification: 40kHz Omni-Directional Ultrasound Transmitter US40KT-01", 2000.*
International Preliminary Search Report, FA 664407 and FR 0550519, 3 pgs, (Oct. 26, 2005).
PCT Search Report, PCT/EP2006/060173, 10 pgs. (May 23, 2006).

* cited by examiner

*Primary Examiner*—Dan Pihulic
(74) *Attorney, Agent, or Firm*—Nixon Peabody LLP

(57) ABSTRACT

A standard non-destructive testing probe (4) may be coupled with a localization system (10) according to the invention so as to determine the position of the apparatus (4) on the surface to be analyzed (1) at any moment.

Figure 1:
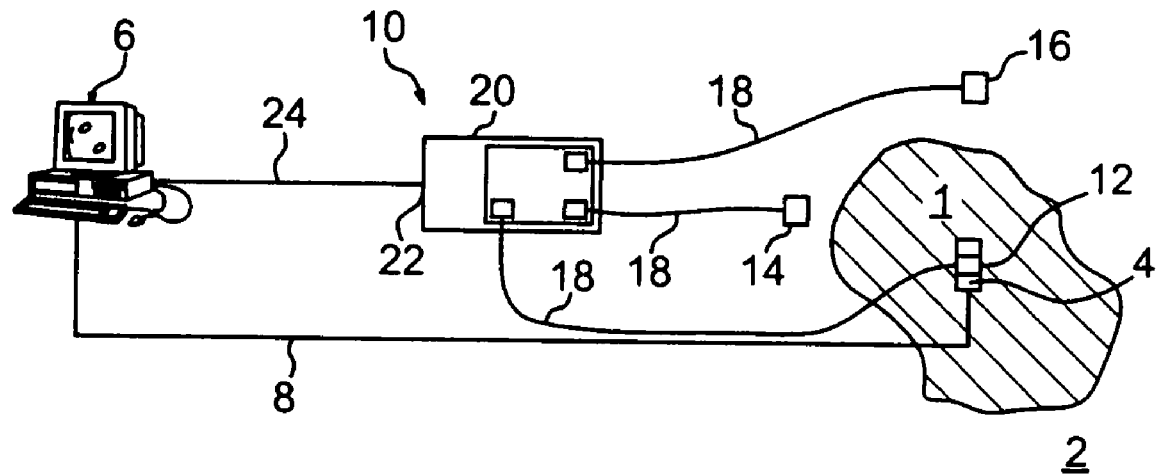

The localization system (10) comprises an ultrasonic emitter (12) and two ultrasonic receivers (14, 16) coupled with means for determining the distance between the emitter (12) and the receivers (14, 16), each of the components being able to be moved freely relative to each other. The coupling between the emitter (12) and the probe (4) allows the position of the latter to be determined by triangulation.

A localization and mapping method is also described.

21 Claims, 1 Drawing Sheet

LOCALIZATION OF A NON-DESTRUCTIVE TESTING PROBE

CROSS REFERENCE TO RELATED APPLICATIONS OR PRIORITY CLAIM

This application is a national phase of International Application No. PCT/EP2006/060173 entitled "Locating A Non-Destructive Control Probe", which was filed on Feb. 22, 2006, which was not published in English, and which claims priority of the French Patent Application No. 05 50519 filed Feb. 25, 2005.

TECHNICAL FIELD

The invention is located in the field of non-destructive testing, and more specifically relates to measurements carried out in situ.

The invention relates to the possibility of carrying out a localized analysis of a material, even as a mapping, without any heavy tools for positioning the measurement probe. The invention thus relates to a method for determining the localization of the measurement, as well as to a system allowing these determinations.

STATE OF THE PRIOR ART

In many fields, such as for example in medicine, it may prove to be absolutely necessary to carry out analyses and inspections of materials without altering their properties.

A non-destructive testing (NDT) apparatus usually comprises a measurement probe, with one or more emitters and one or more receivers for a physical or physico-chemical characteristic, connected to a module for processing the signals. Usually, the processing module is functionally connected to a screen with which the characteristics obtained thereby may be displayed.

The heterogeneities sought in the materials to be analyzed may however be of variable sizes, and of various profiles: mapping is then desirable. Moreover, the material to be tested may be part of an assembly, and it is often preferable not to isolate it from it for reasons of procedural costs.

In particular, in the aeronautical field, a NDT is used for determining the properties of a material, for example making up the fuselage of an aircraft, and for checking their compatibility with standards in effect (thickness, presence of fractures or cracks, of corroded points, etc.). For this purpose, inspections with ultrasound or eddy current testing are particularly useful for evaluating impact resistance, for example for localizing and measuring the defects of a specimen.

A mapping is the result of the association of a physical quantity provided by a probe, a NDT probe for example, with its position. Moreover, within the framework of detecting defects using ultrasonic waves, positioning systems exist which encode the position of the probe by acoustic emission with emitters and receivers of the piezoelectric ceramic type (the BATTY system by Tecnatom for example). The position is generally obtained by a mechanical localization system, of the displacement arm or ramp type of the probe. This type of localization is however very cumbersome to use, and usually requires displacement of the part to be analyzed in order to position it at the localization system, and therefore the existence of a frame on which the receivers are attached.

DISCUSSION OF THE INVENTION

The invention proposes among other advantages, a system and method for overcoming the above mentioned drawbacks of the existing pieces of equipment and for carrying out, for example, a mapping in situ of a material to be analyzed. In particular, by means of the invention, it is possible to recover coordinates, for example Cartesian coordinates, of a measuring probe, for generating a health map of the analyzed material.

In one of its aspects, the invention relates to a localization system comprising an emitter and two receivers of a signal, and a device with which the delay between emission and receptions may be measured. Preferably, the measurement of the delays, i.e., durations corresponding to shifts between the signals, is transmitted to means for measuring the position of the emitter, for example by triangulation.

The system according to the invention is particularly easy to apply because each of the receivers and emitter may be positioned independently. For example, when the signal used for determining the duration consists of acoustical waves, the receivers are associated with means so as to be firmly attached in a reversible way to a surface, such as suction cups, without being coupled to each other. The emitter may for example be a piezoelectric film associated with a sticker so as to be coupled with the apparatus, the localization of which is intended to be determined.

The determination of the distances between the emitter and receivers is advantageously carried out by means of a synchronization pulse which may be emitted at a fixed rate if mapping is contemplated. The receivers may for example be coupled with time-measuring means triggered by the pulse at the same time as the emitter is activated, and which stop when the receivers receive the signal emitted during the pulse.

With this configuration, it is for example possible to use only two receivers for two-dimensional determination of the localization of the transmitting probe.

Advantageously, the different components used for determining the periods are placed in a casing in which the emitter and the receivers are coupled through a wire connection. Preferably, these pieces of information concerning the durations are transmitted to a software package for determining the position by data communications, for example through a USB connection. Preferably, the determination software is associated with the measuring apparatus, i.e., with the analysis means coupled with the probe.

It is advantageous if calibration of the localizations is carried out beforehand. The system may comprise calibration means, and in particular, a device for guiding this step, for example a software package. It may be desirable to have a positioning auxiliary for accelerating the placement of the emitter during the calibration.

In another aspect, the invention relates to a method for localizing a measuring probe, which uses the coupling of the probe with an emitter and the localization of this emitter by triangulation by means of two receivers. Preferably, a system according to the invention is used.

In a preferred aspect, the method is used in a method for mapping a surface, in which a probe is localized with a preferably regular frequency, and the localization data are associated with the measurements of the probe. In order to increase accuracy, the receivers are placed outside the surface to be mapped.

The methods according to the invention are preferably preceded by a calibration which does not require the measurement of the distance separating the receivers. Advantageously, calibration is carried out by positioning the emitter at three points regularly spaced along the right bisector of both receivers. The calibration may be assisted by a software package and a positioning auxiliary.

SHORT DESCRIPTION OF THE DRAWINGS

The features and advantages of the invention will be better understood upon reading the description which follows and with reference to the appended drawings, given as an illustration and being by no means limiting.

FIG. 1 schematically illustrates the localization and mapping system according to a preferred embodiment of the invention.

Figure 2:
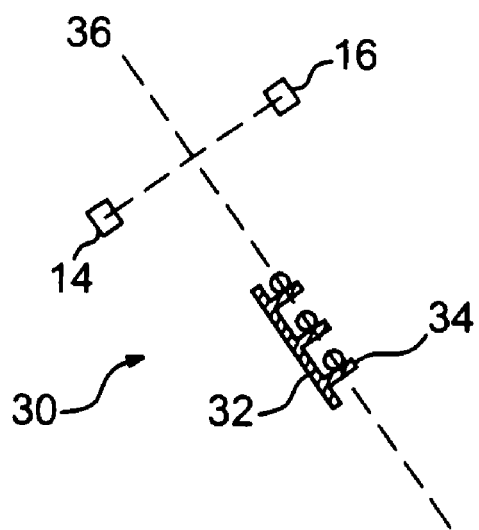

FIG. 2 illustrates a method for calibration prior to a mapping according to an embodiment of the invention.

DETAILED DISCUSSION OF PARTICULAR EMBODIMENTS

As shown in FIG. 1, an area 1 of any part 2 is analyzed by means of a probe 4 by an operator. By "operator" is meant both a human operator and for example if the environment of the part 2 is protected, a manipulator arm manually actuated from a distance.

The part 2 from which stems the portion 1 to be analyzed, which may moreover be an integral part of it, may for example be a region of the fuselage of an aircraft, a component of an engine, etc. Both the part 2 and the area 1 may be of different configurations, but usually they have an average or even zero curvature, and irregularities. The surface of the area 1 may for example be of the order of 50-400 cm2, and conventionally it is less than one square meter: indeed, manual displacement of the probe 4 may prove to be tedious for parts that are too large. Preferably, the area to be analyzed 1 is left in a functional position within the part 2: for example, within the framework of an impact on an aircraft, the analysis is carried out directly during a maintenance operation.

In such an aeronautical application, it is preferred that ultrasonic waves or eddy currents be used by the probe 4 to determine the characteristics of the material 1. As usual, the probe 4 is connected to means for analyzing the inspection data, if possible for storing and displaying them; most often, the probe 4 is thereby connected to a microcomputer 6 having suitable processing software packages. The connection 8 between both of these components 4, 6 may be of any known type. Similarly, the distance between the measurement and data analysis and/or storage operations may be larger or smaller depending on whether the operator is in the same room as the computer 6 or located at a distance. In fact, the localization system 10 according to the invention may be used whatever the type of NDT apparatus 4, 6, 8.

The localization system 10 comprises an emitter 12 of a detectable physical phenomenon, preferably acoustic waves. The emitter 12 advantageously appears as a piezoelectric film (for example PVDF (polyvinylidene fluoride) or a copolymer) which may be coupled with any NDT probe 4, for example by the presence of self-adhesive means. The size of the emitter 12 may be selected according to the size of the probe 4 and the space available for coupling it therewith, but is selected so as to emit a sufficient number of ultrasonic waves when it is activated, in order not to slow down their detection excessively. In particular, a PVDF film of the order of one cm2, for example 5×10 mm2, has proved to be convincing. The emitter 12 may be selected depending on the measurement to be carried out: the system 10 according to the invention may comprise a plurality of emitting components 12, of which only one may be used at the moment of the analysis according to the probe 4.

The signal emitted by the emitter 12 is intended to be sensed by several receivers; preferably, two ultrasound receivers 14, 16 of the piezoelectric ceramic type, which are notably available commercially, are used in particular. Advantageously, the receivers 14, 16 are provided with means for removably attaching them to a surface of part 2 in particular, suction cups for example.

The emitter 12 and receivers 14, 16 are preferably connected through wire connections 18, to a casing 20 of the localization system 10. In the device according to the invention, the receivers 14, 16 are totally independent of each other, and independent of the emitter 12: each component 14, 16 may be positioned in any accessible point without the presence of a supporting frame or a guiding rail, and the emitter 12 may be displaced in any direction relative to the latter.

Preferably, both receivers 14, 16 are localized outside the area 1 to be analyzed, on the same surface of the part 2.

Localization of the NDT probe 2 is carried out by triangulation, i.e. with the distance from the emitting film 12 to each of the receivers 14, 16, it is possible to determine coordinates of the emitter 12. In particular, the delay between each emission and reception allows the relative localization of the probe 4 to be determined using the propagation velocity of the physical phenomenon and the distance between the receivers. Synchronization between the measurements is therefore desirable.

In the field of office automation, the use for example of synchronization by an infrared diode (Mimio™ system) is known for recognizing the position.

According to the invention, the synchronization is carried out by means of an electric pulse actuating the piezoelectric film 12; preferably, each receiver 14, 16 is coupled with a counter, a stopwatch or any other means for determining a duration. Upon sending an electric pulse, the counters of the receivers 14, 16 are triggered, at the same time as the piezoelectric film 12 emits an ultrasonic signal. When both piezoceramic receivers 14, 16 receive the signal emitted by the piezoelectric film 12, the counters are stopped. If the velocity of ultrasound is known, with the value of the counters, it is possible to determine the distance separating the probe 4 from each of the receivers 14, 16; by triangulation, it is possible to determine the coordinates X, Y of the probe 4 in a reference system based on both receivers.

It is possible to perform the computation of the coordinates directly at the casing 20 of the localization system 10, for example with an electronic card. Advantageously, in order to lighten the device 10, the electronic card present in the casing 20 is only used for determining the values of the counters, the remainder of the calculations may be performed remotely. For this purpose, the casing 20 is provided with a communications port 22 allowing data from the electronic card to be transferred to computing means.

Advantageously, in order to notably make the configuration more flexible and to reduce costs, the communications port 22 is a USB port which allows the device 10 according to the invention to be used as a light and easily transportable computer peripheral, capable of being connected to any computer. Preferably, the USB connection 24 is also used for handling the synchronization pulses. The data to be transferred however do not require a throughput making this type of connection absolutely necessary.

In particular, it proves to be particularly advantageous to carry out triangulation computations with the same means as those used for analyzing the data emitted by the probe 4. Thus, the USB port 22 of the casing 20 may be connected to the computer 6 to which the probe 4 is coupled and which is provided in this case with a positioning software package. This coupling 24 is particularly advantageous if mapping is desired, i.e., if the results given by the probe 4 are displayed, matching a representation of the area 1.

For a mapping, successive values of positions are required. Depending on the distance between the emitter 12 and receivers 14, 16 (i.e. the minimum duration of reception), the desired mapping accuracy and the displacement velocity of the probe 4, it is possible to use different pulse rates, but preferably less than 150 or 200 Hz in order to avoid any overlapping of two emission/reception sequences. A value of 80 Hz for ultrasound has proven to be suitable.

In particular in this case of a mapping, but also if only one accurate determination of the localization of the probe 4 is desired, a calibration may be carried out: the synchronization of the counters is corrected, the position of the receivers 14, 16 is determined, so as to then obtain an "absolute" localization (i.e. subject to physical limits) from the results.

Advantageously, according to the invention, calibration is carried out without measuring the distance between the receivers 14, 16, a result marred by errors if both receivers are totally independent of each other, notably in the absence of a coupling rail, and localized on a curved surface 2 for example.

Preferably, the calibration is assisted, i.e., the positioning software package for example has a module for guiding the different calibration steps. In particular, prior to the measurements, the emitter 12 is positioned on the area to be analyzed 1 in at least two points separated by a fixed length along the right bisector, and the value of the distances is determined. Advantageously, a positioning auxiliary or gauge 30, as illustrated in FIG. 2, is associated with the system 10 according to the invention to assist in positioning the probe during this step.

According to a preferred embodiment the calibration method, makes it possible to get rid of the "temperature" parameter: three points are used in order to obtain a system of equations with which the velocity of the ultrasonic or acoustical waves may be determined by computation, therefore without having to know the temperature at which the measurement is carried out. This is particularly advantageous in the aeronautical field when the temperature may strongly vary depending on the part concerned and on the location of the operating site. With this step, it is possible to lighten the system by the absence of means for measuring the temperature, and to increase the reliability of the result by suppressing an additional source of inaccuracies. The measurement of the characteristics of the area 1 as such, even in the case of mapping, is sufficiently fast in order to consider temperature as constant throughout the process. However, it is possible to proceed with regular calibrations.

In particular, at the beginning of NDT, the emitter 12 is firmly attached on the probe 4; both receivers 14, 16 are "stuck" on the surface 2 of the material to be analyzed. A gauge 30, for example a ruler 32, provided with three parallel equidistant branches 34, is substantially positioned along the right bisector 36 of both receivers 14, 16. The probe 4 is positioned successively along the three branches 34 on the right bisector 36: each positioning is optimized via assistance from the software and depending on the times provided by the counters associated with the receivers 14, 16. Two identical intervals of a known length are thereby obtained: it is possible to infer from this the velocity of the ultrasonic waves required for the determinations of localization, and the distance between the emitters allowing mapping. This step is very fast and only prolongs the actual measurement by a few seconds, less than 20 s for a technician/operator.

The actual measurement by the probe 4 may then take place. The probe 4 is displaced over the area 1, usually by scanning, the characteristics of the material 2 are stored and analyzed by the computer 6 which may couple them with the data of the system 10 and display them according to any known form (notably as a graph).

The described localization system 10 uses acoustic emission; other possibilities are open. It is applicable to any non-destructive testing technique, while not being very cumbersome, both as regards space and weight (for example, it may be placed in the pocket of working garment, or even of a jacket). In particular, it may be adapted to any existing probe 4 and used for maintenance, including an ultrasonic probe, the working frequency between both positioning and analyzing operations being very different. The dimensions and concavity of the inspection area 1 are freely selected, within the limit of the capabilities of the apparatus 10 and of the probe 4.

The system 10 according to the invention is particularly simple to apply, especially in the embodiment with the USB connection. It does not require any expensive hardware, notably when wire connections 18 are used; for this type of computation, current data processing software packages may be used.

By making the system 10 heavier, it is possible to consider producing a three-dimensional mapping, for example by using a third receiver. However, these alternatives are achieved to the detriment of the facility and rapidity of use.

The invention claimed is:

1. A system for determining location of an apparatus, comprising:
    a signal emitter;
    exactly two receivers of the emitted signal;
    means for applying a synchronization pulse to the emitter thereby activating the emitter;
    means coupled to the means for applying a synchronization pulse, for determining the duration between the emission of the signal stemming from the activation and its reception by each receiver, and based on the duration, determining said location;
    wherein the receivers are not fixed and may be positioned independently of each other and the emitter may be positioned independently of each receiver.

2. The system according to claim 1, wherein the emitter comprises means couplable with the apparatus and each receiver comprises means couplable with a surface being measured.

3. The system according to claim 1, wherein the signal is ultrasonic and the receivers are associated with counters for measuring the delay between the pulse and the reception of the ultrasonic waves by the receivers.

4. The system according to claim 3, wherein the emitter comprises a piezoelectric film.

5. The system according to claim 1, wherein the means for applying a synchronization pulse to the emitter are adapted so as to emit the pulse repeatedly, at a fixed rate.

6. The system according to claim 1, comprising a casing surrounding the means for applying a synchronization pulse to the emitter and the means coupled to the means for applying a synchronization pulse for determining the duration between the emission of the signal stemming from the activation and its reception by each receiver, and with which the emitter and the receivers are coupled by wire connections.

7. The system according to any of claim 1, further comprising means coupled to the means for applying a synchronization pulse for determining the position of the emitter by triangulation according to the determined durations.

8. The system according to claim 1, further comprising means coupled to the means for applying a synchronization pulse for determining the position of the emitter by triangulation according to the determined durations and a casing comprising a communications port to which are connected the means for determining the position.

9. The system according to claim 8, wherein the communication port is a USB port.

10. The system according to claim 9, comprising means for calibrating the relative position of the emitter and receivers.

11. The system according to claim 10, wherein the calibration means comprise an accessory for positioning and means for guiding the calibration process.

12. A method for analyzing an area by measuring probe with the determining of the location said probe, comprising:
   coupling of the measuring probe with an emitter of a signal;
   placement of exactly two independent receivers on a surface comprising the area to be analyzed;
   emission of a synchronization pulse for activating the signal emitter;
   measurement of the duration between the pulse and the reception of the signal by the receivers;
   determination of the position of the probe by triangulation from the measured durations
   wherein the receivers are not fixed and may be positioned independently of each other and the emitter may be positioned independently of each receiver.

13. The method according to claim 12, wherein the area to be analyzed is a portion of a surface of a material and the receivers are positioned on the surface outside the portion to be analyzed.

14. The method according to claim 12, further comprising a calibration of the position of both receivers.

15. The method according to claim 14, wherein the calibration comprises the positioning of the probe in two points at least substantially located at the right bisector between the two receivers.

16. The method according to claim 14, wherein the calibration comprises the positioning of the probe in at least three points spaced apart at regular intervals along the right bisector.

17. The method according to claim 12, further comprising positioning of the probe by means of a positioning auxiliary.

18. The method for mapping a surface using a method according to claim 12, wherein the emission, duration measurement and determination steps are repeated for each mapping point.

19. A method according to claim 12, wherein the emitter and receivers use an ultrasound signal.

20. The method according to claim 12, wherein the emitter and receivers are part of a system comprising:
   the signal emitter;
   the receivers;
   means for applying a synchronization pulse to the emitter thereby activating the emitter;
   means coupled to the means for applying a synchronization pulse for determining the duration between the emission of the signal stemming from the activation and its reception by each receiver;
   wherein the receivers are not fixed and the emitter may be positioned independently of each other and the emitter may be positioned independently of each receiver.

21. The method according to claim 12, wherein the determination of the position of the probe is associated with the analysis of the measurement of the probe.

* * * * *